United States Patent
Hosokawa et al.

(10) Patent No.: US 11,565,966 B2
(45) Date of Patent: Jan. 31, 2023

(54) GLASS COMPOSITION FOR GLASS FIBER, GLASS FIBER, AND GLASS FIBER-REINFORCED RESIN COMPOSITION USING SAME

(71) Applicant: NITTO BOSEKI CO., LTD., Fukushima (JP)

(72) Inventors: Takanobu Hosokawa, Fukushima (JP); Hiroyuki Yabe, Fukushima (JP); Tadashi Kurita, Fukushima (JP); Takashi Nonaka, Fukushima (JP)

(73) Assignee: Nitto Boseki Co., Ltd., Fukushima (JP)

(*) Notice: Subject to any disclaimer, the term of this patent is extended or adjusted under 35 U.S.C. 154(b) by 0 days.

(21) Appl. No.: 16/622,345

(22) PCT Filed: Jul. 20, 2018

(86) PCT No.: PCT/JP2018/027327
§ 371 (c)(1),
(2) Date: Dec. 13, 2019

(87) PCT Pub. No.: WO2019/049526
PCT Pub. Date: Mar. 14, 2019

(65) Prior Publication Data
US 2020/0199015 A1    Jun. 25, 2020

(30) Foreign Application Priority Data

Sep. 8, 2017 (JP) .............................. JP2017-173114

(51) Int. Cl.
C03C 13/00    (2006.01)
C03C 3/118    (2006.01)
C08J 5/04    (2006.01)

(52) U.S. Cl.
CPC .............. *C03C 13/00* (2013.01); *C03C 3/118* (2013.01); *C08J 5/043* (2013.01); *C03C 2213/00* (2013.01)

(58) Field of Classification Search
None
See application file for complete search history.

(56) References Cited

U.S. PATENT DOCUMENTS

| | | | | |
|---|---|---|---|---|
| 4,824,806 A * | 4/1989 | Yokoi | ..................... | C03C 13/00 501/35 |
| 5,326,730 A * | 7/1994 | Dumbaugh, Jr. | ....... | C03C 3/085 349/158 |
| 5,958,808 A * | 9/1999 | Mori | ....................... | C03C 13/00 501/36 |
| 6,525,300 B1 * | 2/2003 | Mitra | ........................ | C03C 8/02 219/443.1 |
| 6,846,761 B2 * | 1/2005 | Tamura | ................ | H05K 1/0366 501/38 |
| 8,679,993 B2 | 3/2014 | Sawanoi et al. | | |
| 8,828,897 B2 * | 9/2014 | Fechner | ................ | C03C 4/0092 501/70 |
| 8,993,465 B2 * | 3/2015 | Ellison | .................... | C03C 3/087 501/69 |
| 2012/0135852 A1 | 5/2012 | Ellison et al. | | |

FOREIGN PATENT DOCUMENTS

| | | | |
|---|---|---|---|
| CA | 2279785 | * | 7/1999 |
| CN | 1186482 A | | 7/1998 |
| CN | 1778746 A | | 5/2006 |
| CN | 100418911 C | * | 9/2008 |
| CN | 104556710 A | | 4/2015 |
| DE | 19512847 | * | 11/1996 |
| EP | 0 978 493 A1 | | 2/2000 |
| JP | 07-10598 | * | 1/1995 |
| JP | 2007-10598 | * | 1/1995 |
| JP | H10-167759 A | | 6/1998 |
| JP | H11-292567 A | | 10/1999 |
| JP | 2000-095540 A | | 4/2000 |
| JP | 3240271 | * | 12/2001 |
| JP | 2010-508226 A | | 3/2010 |
| JP | 2013-151416 A | | 8/2013 |
| JP | 5578322 | * | 8/2014 |
| WO | 2012/118163 A1 | | 9/2012 |

OTHER PUBLICATIONS

English abstract of JP 2007-10598, Jan. 13, 1995, 6 pages, Japan.*
English absract of JP 07010598 A, 8 pages, Jan. 13, 1995, Japan.*
Search Report dated Apr. 20, 2020 issued in the corresponding European patent application No. 18853783.1.

* cited by examiner

*Primary Examiner* — Tae H Yoon
(74) *Attorney, Agent, or Firm* — Carrier Shende & Associates, P.C.; Joseph P. Carrier; Anne G. Sabourin

(57) ABSTRACT

Provided is a glass composition for glass fiber having a low dielectric constant and a low dielectric loss tangent, suppressing occurrence of phase separation, and reducing viscosity at high temperatures. The glass composition for glass fiber includes: $SiO_2$ in the range of 52.0 to 59.5% by mass; $B_2O_3$ in the range of 17.5 to 25.5% by mass; $Al_2O_3$ in the range of 9.0 to 14.0% by mass; SrO in the range of 0.5 to 6.0% by mass; MgO in the range of 1.0 to 5.0% by mass; and CaO in the range of 1.0 to 5.0% by mass, and includes $F_2$ and $Cl_2$ in the range of 0.1 to 2.5% by mass in total, with respect to the total amount.

7 Claims, No Drawings

GLASS COMPOSITION FOR GLASS FIBER, GLASS FIBER, AND GLASS FIBER-REINFORCED RESIN COMPOSITION USING SAME

PRIORITY DATA

This application is a U.S. National Phase filing of PCT Application Number PCT/JP2017/045341, filed Dec. 18, 2017, which claims priority to Japanese Application Number JP2017-080862.

TECHNICAL FIELD

The present invention relates to a glass composition for glass fiber, glass fiber formed from the glass composition for glass fiber, and a glass fiber-reinforced resin composition using the glass fiber.

BACKGROUND ART

Glass fiber is manufactured by melting a glass raw material prepared so as to be a glass composition for glass fiber having a desired composition in a melting furnace to form molten glass (a melt of the glass composition for glass fiber); discharging the molten glass from a container (bushing) having a nozzle plate on which tens to thousands of nozzle tips are formed; and cooling the discharged molten glass while stretching by winding at a high speed to solidify it into fiber (hereinafter, this operation is sometimes referred to as "spinning"). The above bushing is formed from a noble metal such as platinum.

Conventionally, glass fiber has been widely used in various applications to improve the strength of resin molded products, and the resin molded products have been increasingly used for a housing or a part of electronic devices such as a server, a smartphone, and a laptop computer, and the like.

In general, glass absorbs energy from alternating current as heat, and thus has a problem that the above resin molded product generates heat when the resin molded product is used for a housing or a part of the electronic devices.

The dielectric loss energy absorbed by glass is proportional to the dielectric constant and the dielectric loss tangent determined by the component and structure of the glass, and is represented by the following formula (1):

$$W = kfv^2 \times \varepsilon \tan \delta \quad (1)$$

wherein W is a dielectric loss energy, k is a constant, f is a frequency, $v^2$ is a potential gradient, $\varepsilon$ is a dielectric constant, and tan $\delta$ is a dielectric loss tangent. From formula (1), it is found that the dielectric loss is larger and heat generation of the above resin molded product is larger as the dielectric constant and the dielectric loss tangent are larger and as the frequency is higher.

Conventionally, as a glass composition for glass fiber, the E glass composition (composition including $SiO_2$ in the range of 52.0 to 56.0% by mass; $Al_2O_3$ in the range of 12.0 to 16.0% by mass; MgO and CaO in the range of 20.0 to 25.0% by mass in total; and $B_2O_3$ in the range of 5.0 to 10.0% by mass, with respect to the total amount of the glass fiber) has been most commonly used. On the other hand, known is a glass composition for glass fiber capable of forming glass fiber having a lower dielectric constant and a lower dielectric loss tangent than glass fiber (E glass fiber) formed from E glass composition by increasing the content of $SiO_2$ or by increasing the content of $B_2O_3$ as compared to the E glass composition, or the like, in order to reduce the above dielectric loss energy (refer to Patent Literature 1 and Patent Literature 2).

CITATION LIST

Patent Literature

Patent Literature 1: Japanese Patent Laid-Open No. 2013-151416
Patent Literature 2: Japanese Patent Laid-Open No. H 10-167759

SUMMARY OF INVENTION

Technical Problem

However, in recent years, in response to the fact that the frequency of the alternating current used in a housing or a part of the above electronic devices has increased, a lower dielectric constant and a lower dielectric loss tangent have been required for the glass fiber used for a housing or a part of the above electronic device in order to reduce dielectric loss energy.

There has been a disadvantage that when the content of $SiO_2$ in the glass composition for glass fiber is increased in order to achieve a low dielectric constant and a low dielectric loss tangent, the viscosity of the glass composition for glass fiber at high temperatures becomes high, and hence the temperature for obtaining the molten glass (melting temperature) and the temperature for spinning the glass composition for glass fiber (spinning temperature) increase, so that stable glass fiber spinning (glass fiber manufacturing) cannot be performed. Furthermore, there is a disadvantage that the life of the melting furnace or the glass fiber manufacturing facility is shortened.

There is a disadvantage that, on the other hand, when the content of $B_2O_3$ in the glass composition for glass fiber is increased in order to achieve a low dielectric constant and a low dielectric loss tangent, phase separation in the glass fiber tends to occur, so that the chemical durability of the glass fiber deteriorates and the homogeneity of the glass fiber is impaired.

An object of the present invention is to provide a glass composition for glass fiber having a low dielectric constant and a low dielectric loss tangent, suppressing occurrence of phase separation, and reducing viscosity at high temperatures by eliminating these disadvantages. An object of the present invention is also to provide glass fiber formed from the glass composition for glass fiber and a glass fiber-reinforced resin composition using the glass fiber.

Solution to Problem

In order to achieve the objects, the glass composition for glass fiber of the present invention includes: $SiO_2$ in a range of 52.0 to 59.5% by mass; $B_2O_3$ in a range of 17.5 to 25.5% by mass; $Al_2O_3$ in a range of 9.0 to 14.0% by mass; SrO in a range of 0.5 to 6.0% by mass; MgO in a range of 1.0 to 5.0% by mass; and CaO in a range of 1.0 to 5.0% by mass, and includes $F_2$ and $Cl_2$ in a range of 0.1 to 2.5% by mass in total, with respect to total amount of the glass composition for glass fiber.

According to the glass composition for glass fiber of the present invention, including $SiO_2$, $B_2O_3$, $Al_2O_3$, SrO, MgO, CaO, and $F_2$ or $Cl_2$ in the above range results in having a low dielectric constant and a low dielectric loss tangent, suppressing the occurrence of phase separation, and reducing the viscosity at high temperatures.

Having a low dielectric constant means that the dielectric constant is 4.6 or less at a frequency of 10 GHz. Having a low dielectric loss tangent means that the dielectric loss tangent is 0.0024 or less at a frequency of 10 GHz. Reducing the viscosity at high temperatures means that the 1000 poise temperature (the temperature at which the viscosity of the molten glass becomes 1000 poise (100 Pa·s)) is 1420° C. or less.

In the glass composition for glass fiber of the present invention, preferably, the content X (% by mass) of $B_2O_3$, the content Y (% by mass) of $Al_2O_3$, and the content Z (% by mass) of SrO satisfy the following formula (2).

$$50.0 \leq (X^3 \times Y)/(1000 \times Z^{1/2}) \leq 80.0 \quad (2)$$

When the above X, Y, and Z satisfy the above formula (2), the glass composition for glass fiber of the present invention has a lower dielectric constant and a lower dielectric loss tangent, suppresses the occurrence of phase separation, and reduces the viscosity at high temperatures.

Having a lower dielectric constant means that the dielectric constant is 4.5 or less at a frequency of 10 GHz. Having a lower dielectric loss tangent means that the dielectric loss tangent is 0.0020 or less at a frequency of 10 GHz.

In the glass composition for glass fiber of the present invention, more preferably, the content X (% by mass) of $B_2O_3$, the content Y (% by mass) of $Al_2O_3$, and the content Z (% by mass) of SrO satisfy the following formula (3).

$$56.5 \leq (X^3 \times Y)/(1000 \times Z^{1/2}) \leq 66.0 \quad (3)$$

When the above X, Y, and Z satisfy the above formula (3), the glass composition for glass fiber of the present invention has an extremely low dielectric constant and an extremely low dielectric loss tangent, more certainly suppresses the occurrence of phase separation, and reduces the viscosity at high temperatures.

Having an extremely low dielectric constant means that the dielectric constant is 4.3 or less at a frequency of 10 GHz. Having an extremely low dielectric loss tangent means that the dielectric loss tangent is 0.0019 or less at a frequency of 10 GHz.

In the glass composition for glass fiber of the present invention, preferably, a content X (% by mass) of $B_2O_3$, a content Y (% by mass) of $Al_2O_3$, a content Z (% by mass) of SrO, and a total content W (% by mass) of $F_2$ and $Cl_2$ satisfy the following formula (4).

$$50.0 \leq (W^{1/8} \times X^3 \times Y)/(1000 \times Z^{1/2}) \leq 85.0 \quad (4)$$

When the above W, X, Y, and Z satisfy the above formula (4), the glass composition for glass fiber of the present invention has a lower dielectric constant and a lower dielectric loss tangent, suppresses the occurrence of phase separation, and reduces the viscosity at high temperatures.

In the glass composition for glass fiber of the present invention, more preferably, the content X (% by mass) of $B_2O_3$, the content Y (% by mass) of $Al_2O_3$, the content Z (% by mass) of SrO, and the total content W (% by mass) of $F_2$ and $Cl_2$ satisfy the following formula (5).

$$55.0 \leq (W^{1/8} \times X^3 \times Y)/(1000 \times Z^{1/2}) \leq 66.0 \quad (5)$$

When the above W, X, Y, and Z satisfy the above formula (5), the glass composition for glass fiber of the present invention has an extremely low dielectric constant and an extremely low dielectric loss tangent, more certainly suppresses the occurrence of phase separation, and reduces the viscosity at high temperatures.

The glass fiber of the present invention is formed from the above glass composition for glass fiber of the present invention. That is, the glass fiber of the present invention comprises the glass composition described in the above glass composition for glass fiber of the present invention. The glass fiber of the present invention can be obtained by, for example, melting the above glass composition for glass fiber of the present invention, discharging the obtained melt from a bushing having a nozzle plate with 1 to 8000 nozzle tips or holes formed therein, and cooling the melt while stretching by winding at a high speed to solidify it into a fiber.

The glass fiber-reinforced resin composition of the present invention includes the above glass fiber of the present invention. The glass fiber-reinforced resin composition of the present invention includes 10 to 90% by mass of glass fiber in the glass fiber-reinforced resin composition including, for example, a resin (thermoplastic resin or thermosetting resin), glass fiber, and other additives, with respect to the total amount of the glass fiber-reinforced resin composition.

DESCRIPTION OF EMBODIMENTS

Hereinafter, embodiments of the present invention will be described in detail.

The glass composition for glass fiber of the present embodiment includes: $SiO_2$ in the range of 52.0 to 59.5% by mass; $B_2O_3$ in the range of 17.5 to 25.5% by mass; $Al_2O_3$ in the range of 9.0 to 14.0% by mass; SrO in the range of 0.5 to 6.0% by mass; MgO in the range of 1.0 to 5.0% by mass; and CaO in the range of 1.0 to 5.0% by mass, and includes $F_2$ and $Cl_2$ in the range of 0.1 to 2.5% by mass in total, with respect to the total amount of the glass composition for glass fiber. According to the above glass composition for glass fiber, including $SiO_2$, $B_2O_3$, $Al_2O_3$, SrO, MgO, CaO, and $F_2$ or $Cl_2$ in the above range results in having a low dielectric constant and a low dielectric loss tangent, suppressing the occurrence of phase separation, and reducing the viscosity at high temperatures.

When the glass composition for glass fiber of the present embodiment has a content of $SiO_2$ of less than 52.0% by mass with respect to the total amount of the glass composition for glass fiber, the mechanical strength of the glass fiber formed from the glass composition for glass fiber is greatly reduced, and the function of the glass fiber as a reinforcing material in the glass fiber-reinforced resin composition is impaired. In addition, the glass fiber tends to deteriorate when placed in an acidic environment. On the other hand, when the content of $SiO_2$ is more than 59.5% by mass with respect to the total amount of the glass composition for glass fiber, the viscosity at high temperatures increases (that is, the 1000 poise temperature increases), and thereby the melting temperature and the spinning temperature increase and stable glass fiber manufacturing cannot be performed. When the content of $SiO_2$ is more than 59.5% by mass with respect to the total amount of the glass composition for glass fiber, the life of the melting furnace or the glass fiber manufacturing facility is shortened. When the content of $SiO_2$ is more than 59.5% by mass with respect to the total amount of the glass composition for glass fiber, phase separation tends to occur in the glass fiber.

In the glass composition for glass fiber of the present embodiment, the content of $SiO_2$ with respect to the total amount of the glass composition for glass fiber is preferably 54.4 to 59.2% by mass, more preferably 55.2 to 58.4% by mass, still more preferably 55.6 to 57.8% by mass, and particularly preferably 56.0 to 57.2% by mass.

When the glass composition for glass fiber of the present embodiment has a content of $B_2O_3$ of less than 17.5% by mass with respect to the total amount of the glass composition for glass fiber, the dielectric constant and the dielectric loss tangent of the glass composition for glass fiber cannot be sufficiently reduced. On the other hand, when the content of $B_2O_3$ is more than 25.5% by mass with respect to the total amount of the glass composition for glass fiber, the occurrence of phase separation in the glass composition for glass fiber cannot be sufficiently suppressed.

In the glass composition for glass fiber of the present embodiment, the content of $B_2O_3$ with respect to the total amount of the glass composition for glass fiber is preferably 17.8 to 23.0% by mass, more preferably 18.2 to 22.8% by mass, still more preferably 18.8 to 22.7% by mass, furthermore preferably 19.6 to 22.6% by mass, particularly preferably 20.2 to 22.5% by mass, more particularly preferably 20.8 to 22.4% by mass, extremely preferably 21.4 to 22.3% by mass, and most preferably 21.8 to 22.2% by mass.

When the glass composition for glass fiber of the present embodiment has a content of $Al_2O_3$ of less than 9.0% by mass with respect to the total amount of the glass composition for glass fiber, the occurrence of phase separation in the glass composition for glass fiber cannot be sufficiently suppressed. On the other hand, when the content of $Al_2O_3$ is more than 14.0% by mass with respect to the total amount of the glass composition for glass fiber, the dielectric constant and the dielectric loss tangent of the glass composition for glass fiber cannot be sufficiently reduced.

In the glass composition for glass fiber of the present embodiment, the content of $Al_2O_3$ with respect to the total amount of the glass composition for glass fiber is preferably 10.0 to 13.6% by mass, more preferably 10.4 to 13.3% by mass, still more preferably 10.8 to 13.0% by mass, furthermore preferably 11.1 to 12.9% by mass, particularly preferably 11.5 to 12.8% by mass, more particularly preferably 11.7 to 12.7% by mass, extremely preferably 11.9 to 12.6% by mass, and most preferably 12.1 to 12.5% by mass.

When the glass composition for glass fiber of the present embodiment has a content of SrO of less than 0.5% by mass or more than 6.0% by mass with respect to the total amount of the glass composition for glass fiber, the dielectric constant or the dielectric loss tangent of the glass composition for glass fiber cannot be sufficiently reduced.

In the glass composition for glass fiber of the present embodiment, the content of SrO with respect to the total amount of the glass composition for glass fiber is preferably 0.8 to 5.5% by mass, more preferably 1.2 to 5.0% by mass, still more preferably 1.8 to 4.8% by mass, furthermore preferably 2.4 to 4.6% by mass, particularly preferably 2.8 to 4.5% by mass, more particularly preferably 3.2 to 4.4% by mass, extremely preferably 3.5 to 4.3% by mass, and most preferably 3.8 to 4.2% by mass.

When the glass composition for glass fiber of the present embodiment has a content of MgO of less than 1.0% by mass with respect to the total amount of the glass composition for glass fiber, the viscosity at high temperatures increases, and thereby the melting temperature and the spinning temperature increase and stable glass fiber manufacturing cannot be performed. On the other hand, when the content of MgO is more than 5.0% by mass with respect to the total amount of the glass composition for glass fiber, the dielectric constant and the dielectric loss tangent of the glass composition for glass fiber cannot be sufficiently reduced, and the occurrence of phase separation in the glass composition for glass fiber cannot be sufficiently suppressed.

In the glass composition for glass fiber of the present embodiment, the content of MgO with respect to the total amount of the glass composition for glass fiber is preferably 1.3 to 4.6% by mass, more preferably 1.5 to 3.6% by mass, still more preferably 1.7 to 2.9% by mass, and particularly preferably 1.9 to 2.3% by mass.

When the glass composition for glass fiber of the present embodiment has a content of CaO of less than 1.0% by mass with respect to the total amount of the glass composition for glass fiber, the viscosity at high temperatures increases, and thereby the melting temperature and the spinning temperature increase and stable glass fiber manufacturing cannot be performed. On the other hand, when the content of CaO is more than 5.0% by mass with respect to the total amount of the glass composition for glass fiber, the dielectric constant and the dielectric loss tangent of the glass composition for glass fiber cannot be sufficiently reduced, and the occurrence of phase separation in the glass composition for glass fiber cannot be sufficiently suppressed.

In the glass composition for glass fiber of the present embodiment, the content of CaO with respect to the total amount of the glass composition for glass fiber is preferably 1.3 to 4.6% by mass, more preferably 1.5 to 3.6% by mass, still more preferably 1.7 to 2.9% by mass, and particularly preferably 1.9 to 2.3% by mass.

When the glass composition for glass fiber of the present embodiment has the total content of $F_2$ and $Cl_2$ of less than 0.1% by mass with respect to the total amount of the glass composition for glass fiber, the viscosity at high temperatures increases, and thereby the melting temperature and the spinning temperature increase and stable glass fiber manufacturing cannot be performed. On the other hand, when the total content of $F_2$ and $Cl_2$ is more than 2.5% by mass with respect to the total amount of the glass composition for glass fiber, the occurrence of phase separation in the glass composition for glass fiber cannot be sufficiently suppressed.

In the glass composition for glass fiber of the present embodiment, the total content of $F_2$ and $Cl_2$ with respect to the total amount of the glass composition for glass fiber is preferably 0.2 to 1.9% by mass, more preferably 0.3 to 1.6% by mass, still more preferably 0.4 to 1.3% by mass, furthermore preferably 0.5 to 1.1% by mass, particularly preferably 0.6 to 1.0% by mass, and most preferably 0.7 to 0.9% by mass.

The glass composition for glass fiber of the present embodiment preferably includes $F_2$ in the range of 0.1 to 2.5% by mass, more preferably includes in the range of 0.2 to 1.9% by mass, still more preferably includes in the range of 0.3 to 1.6% by mass, furthermore preferably includes in the range of 0.4 to 1.3% by mass, particularly preferably includes in the range of 0.5 to 1.1% by mass, more particularly preferably includes in the range of 0.6 to 1.0% by mass, and most preferably includes in the range of 0.7 to 0.9% by mass.

When the glass composition for glass fiber of the present embodiment includes 0.4% by mass or more of $F_2$, $Cl_2$ may not be substantially included (that is, the content of $Cl_2$ may be less than 0.01% by mass).

The glass composition for glass fiber of the present embodiment may include $TiO_2$ in the range of 0 to 6.0% by mass with respect to the total amount of the glass composition for glass fiber. When the glass composition for glass fiber of the present embodiment includes $TiO_2$ and the content of $TiO_2$ is more than 6.0% by mass, $TiO_2$ tends to remain undissolved, and the meltability of the glass composition for glass fiber deteriorates. Further, the glass composition for glass fiber becomes non-uniform, and stable glass fiber manufacturing cannot be performed.

When the glass composition for glass fiber of the present embodiment includes $TiO_2$, from the viewpoint of reducing the dielectric loss tangent, the content of $TiO_2$ with respect to the total amount of the glass composition for glass fiber is preferably 4.5% by mass or less, more preferably 3.0% by mass or less, still more preferably 1.5% by mass or less, and particularly preferably 0.5% by mass or less. On the other hand, from the viewpoint of further reducing the viscosity at high temperatures, for example, of setting the 1000 poise temperature to less than 1400° C., the content of $TiO_2$ with respect to the total amount of the glass composition for glass fiber is preferably 0.5% by mass or more, more preferably 1.0% by mass or more, and preferably 1.5% by mass or more. From the viewpoint of achieving both reduction of the dielectric loss tangent and reduction of the viscosity at high temperatures, the content of $TiO_2$ with respect to the total amount of the glass composition for glass fiber is preferably 0.5 to 4.5% by mass, more preferably 1.0 to 3.0% by mass, and still more preferably 1.5 to 2.5% by mass.

The glass composition for glass fiber of the present embodiment may include ZnO in the range of 0 to 3.0% by mass with respect to the total amount of the glass composition for glass fiber. When the glass composition for glass fiber of the present embodiment includes ZnO and the content of ZnO is more than 3.0% by mass, a devitrified product tends to occur, and stable glass fiber manufacturing cannot be performed.

When the glass composition for glass fiber of the present embodiment includes ZnO, the content of ZnO with respect to the total amount of the glass composition for glass fiber is preferably 2.5% by mass or less, more preferably 1.5% by mass or less, and still more preferably 0.5% by mass or less.

The glass composition for glass fiber of the present embodiment may include $Fe_2O_3$ in the range of 0 to 1.0% by mass with respect to the total amount of the glass composition for glass fiber. When the glass composition for glass fiber of the present embodiment includes $Fe_2O_3$, it is effective to set the content of $Fe_2O_3$ to 0.1 to 0.6% by mass from the viewpoint of suppressing the bubble included in the glass fiber.

The glass composition for glass fiber of the present embodiment may include $SnO_2$ in the range of 0 to 1.0% by mass with respect to the total amount of the glass composition for glass fiber. When the glass composition for glass fiber of the present embodiment includes $SnO_2$, it is effective to set the content of $SnO_2$ to 0.1 to 0.6% by mass from the viewpoint of suppressing the bubble included in the glass fiber.

In the glass composition for glass fiber of the present embodiment, when the total content of $Na_2O$, $K_2O$, and $Li_2O$ is less than 1.0% by mass with respect to the total amount of the glass composition for glass fiber and the content of each component is less than 0.4% by mass, it is acceptable to include $Na_2O$, $K_2O$, or $Li_2O$. When the total content of $Na_2O$, $K_2O$, and $Li_2O$ is 1.0% by mass or more with respect to the total amount of the glass composition for glass fiber or the content of each component is 0.4% by mass or more, the dielectric constant and the dielectric loss tangent of the glass composition for glass fiber are greatly deteriorated.

In the glass composition for glass fiber of the present embodiment, when the content of $ZrO_2$ is less than 0.4% by mass with respect to the total amount of the glass composition for glass fiber, it is acceptable to include $ZrO_2$. When the content of $ZrO_2$ is 0.4% by mass or more with respect to the total amount of the glass composition for glass fiber, the devitrified product tends to occur, and stable glass fiber manufacturing cannot be performed.

In the glass composition for glass fiber of the present embodiment, when the content of $Cr_2O_3$ is less than 0.05% by mass with respect to the total amount of the glass composition for glass fiber, it is acceptable to include $Cr_2O_3$. When the content of $Cr_2O_3$ is 0.05% by mass or more with respect to the total amount of the glass composition for glass fiber, the devitrified product tends to occur, and stable glass fiber manufacturing cannot be performed.

The glass composition for glass fiber of the present embodiment may include, as impurities attributable to raw materials, less than 1.0% by mass of oxides of Ba, P, Mn, Co, Ni, Cu, Mo, W, Ce, Y, and La in total with respect to the total amount of the glass composition for glass fiber.

In the glass composition for glass fiber of the present embodiment, the content X (% by mass) of $B_2O_3$, the content Y (% by mass) of $Al_2O_3$, and the content Z (% by mass) of SrO satisfy the following formula (6).

$$42.0 \leq (X^3 \times Y)/(1000 \times Z^{1/2}) \leq 83.0 \tag{6}$$

In the glass composition for glass fiber of the present embodiment, the above X, Y, and Z preferably satisfy the following formula (7).

$$50.0 \leq (X^3 \times Y)/(1000 \times Z^{1/2}) \leq 80.0 \tag{7}$$

When the above X, Y, and Z satisfy the above formula (7), the glass composition for glass fiber of the present invention has a lower dielectric constant and a lower dielectric loss tangent, suppresses the occurrence of phase separation, and reduces the viscosity at high temperatures.

In the glass composition for glass fiber of the present embodiment, the above X, Y, and Z more preferably satisfy the following formula (8).

$$56.5 \leq (X^3 \times Y)/(1000 \times Z^{1/2}) \leq 66.0 \tag{8}$$

When the above X, Y, and Z satisfy the above formula (8), the glass composition for glass fiber of the present invention has an extremely low dielectric constant and an extremely low dielectric loss tangent, more certainly suppresses the occurrence of phase separation, and reduces the viscosity at high temperatures.

In the glass composition for glass fiber of the present embodiment, the above X, Y, and Z still more preferably satisfy the following formula (9).

$$61.0 \leq (X^3 \times Y)/(1000 \times Z^{1/2}) \leq 65.0 \tag{9}$$

When the above X, Y, and Z satisfy the above formula (9), the glass composition for glass fiber of the present invention has an extremely low dielectric constant and the lowest dielectric loss tangent (that is, a dielectric loss tangent of 0.0018 or less), more certainly suppresses the occurrence of phase separation, and reduces the viscosity at high temperatures.

In the glass composition for glass fiber of the present embodiment, the above X, Y, and Z particularly preferably satisfy the following formula (10).

$$61.5 \leq (X^3 \times Y)/(1000 \times Z^{1/2}) \leq 63.5 \tag{10}$$

When the above X, Y, and Z satisfy the above formula (10), the glass composition for glass fiber of the present invention has the lowest dielectric constant (that is, a dielectric constant of 4.2 or less) and the lowest dielectric loss tangent, more certainly suppresses the occurrence of phase separation, and reduces the viscosity at high temperatures.

In the glass composition for glass fiber of the present embodiment, the content X (% by mass) of $B_2O_3$, the content Y (% by mass) of $Al_2O_3$, the content Z (% by mass) of SrO, and the total content W (% by mass) of $F_2$ and $Cl_2$ satisfy the following formula (11).

$$38.0 \le (W^{1/8} \times X^3 \times Y)/(1000 \times Z^{1/2}) \le 95.0 \quad (11)$$

In the glass composition for glass fiber of the present embodiment, the above W, X, Y, and Z preferably satisfy the following formula (12).

$$50.0 \le (W^{1/8} \times X^3 \times Y)/(1000 \times Z^{1/2}) \le 85.0 \quad (12)$$

When the above W, X, Y, and Z satisfy the above formula (12), the glass composition for glass fiber of the present invention has a lower dielectric constant and a lower dielectric loss tangent, suppresses the occurrence of phase separation, and reduces the viscosity at high temperatures.

In the glass composition for glass fiber of the present embodiment, the above W, X, Y, and Z more preferably satisfy the following formula (13).

$$55.0 \le (W^{1/8} \times X^3 \times Y)/(1000 \times Z^{1/2}) \le 66.0 \quad (13)$$

When the above W, X, Y, and Z satisfy the above formula (13), the glass composition for glass fiber of the present invention has an extremely low dielectric constant and an extremely low dielectric loss tangent, more certainly suppresses the occurrence of phase separation, and reduces the viscosity at high temperatures.

In the glass composition for glass fiber of the present embodiment, the above W, X, Y, and Z still more preferably satisfy the following formula (14).

$$59.5 \le (W^{1/8} \times X^3 \times Y)/(1000 \times Z^{1/2}) \le 65.0 \quad (14)$$

When the above W, X, Y, and Z satisfy the above formula (14), the glass composition for glass fiber of the present invention has an extremely low dielectric constant and the lowest dielectric loss tangent, more certainly suppresses the occurrence of phase separation, and reduces the viscosity at high temperatures.

In the glass composition for glass fiber of the present embodiment, the above W, X, Y, and Z particularly preferably satisfy the following formula (15).

$$60.0 \le (W^{1/8} \times X^3 \times Y)/(1000 \times Z^{1/2}) \le 61.8 \quad (15)$$

When the above W, X, Y, and Z satisfy the above formula (15), the glass composition for glass fiber of the present invention has the lowest dielectric constant and the lowest dielectric loss tangent, more certainly suppresses the occurrence of phase separation, and reduces the viscosity at high temperatures.

In the glass composition for glass fiber of the present embodiment, the content X (% by mass) of $B_2O_3$, the content Y (% by mass) of $Al_2O_3$, the content Z (% by mass) of SrO, and the content w (% by mass) of $F_2$ satisfy the following formula (16).

$$38.0 \le (W^{1/8} \times X^3 \times Y)/(1000 \times Z^{1/2}) \le 95.0 \quad (16)$$

In the glass composition for glass fiber of the present embodiment, the above w, X, Y, and Z preferably satisfy the following formula (17).

$$50.0 (w^{1/8} \times X^3 \times Y)/(1000 \times Z^{1/2}) \le 85.0 \quad (17)$$

When the above w, X, Y, and Z satisfy the above formula (17), the glass composition for glass fiber of the present invention has a lower dielectric constant and a lower dielectric loss tangent, suppresses the occurrence of phase separation, and reduces the viscosity at high temperatures.

In the glass composition for glass fiber of the present embodiment, the above w, X, Y, and Z more preferably satisfy the following formula (18).

$$55.0 \le (w^{1/8} \times X^3 \times Y)/(1000 \times Z^{1/2}) \le 66.0 \quad (18)$$

When the above w, X, Y, and Z satisfy the above formula (18), the glass composition for glass fiber of the present invention has an extremely low dielectric constant and an extremely low dielectric loss tangent, more certainly suppresses the occurrence of phase separation, and reduces the viscosity at high temperatures.

In the glass composition for glass fiber of the present embodiment, the above w, X, Y, and Z still more preferably satisfy the following formula (19).

$$59.5 \le (w^{1/8} \times X^3 \times Y)/(1000 \times Z^{1/2}) \le 65.0 \quad (19)$$

When the above w, X, Y, and Z satisfy the above formula (19), the glass composition for glass fiber of the present invention has an extremely low dielectric constant and the lowest dielectric loss tangent (that is, a dielectric loss tangent of 0.0018 or less), more certainly suppresses the occurrence of phase separation, and reduces the viscosity at high temperatures.

In the glass composition for glass fiber of the present embodiment, the above w, X, Y, and Z particularly preferably satisfy the following formula (20).

$$60.0 \le (W^{1/8} \times X^3 \times Y)/(1000 \times Z^{1/2}) \le 61.8 \quad (20)$$

When the above w, X, Y, and Z satisfy the above formula (20), the glass composition for glass fiber of the present invention has the lowest dielectric constant and the lowest dielectric loss tangent, more certainly suppresses the occurrence of phase separation, and reduces the viscosity at high temperatures.

Regarding measurement of the content of each component described above in the glass composition for glass fiber of the present embodiment, the content of Li as the light element can be measured with an ICP emission spectroscopic analyzer, and the contents of the other elements can be measured with a wavelength dispersive X-ray fluorescence analyzer.

The measurement method is as follows. First, a glass batch (prepared by mixing glass raw material) or glass fiber (when organic matter adheres to the surface of the glass fiber, or when glass fiber is mainly included as a reinforcing material in organic matter (resin), the glass fiber is used after the organic matter is removed by, for example, heating for about 2 to 24 hours in a muffle furnace at 300 to 600° C.) is placed in a platinum crucible and melted with stirring while being held at a temperature of 1550° C. for 6 hours in an electric furnace to obtain a homogeneous molten glass. Next, the obtained molten glass is poured onto a carbon plate to produce a glass cullet, and then pulverized into powder. Regarding Li as a light element, glass powder is thermally decomposed with an acid and then quantitatively analyzed using an ICP emission spectroscopic analyzer. Regarding other elements, glass powder is molded into a disc shape by a pressing machine and then quantitatively analyzed using a wavelength dispersive X-ray fluorescence analyzer. These quantitative analysis results are converted in terms of oxides to calculate the content of each component and the total amount, and the above content of each component can be determined from these numerical values.

The glass composition for glass fiber of the present embodiment can be obtained by melting a glass raw material prepared to have the above composition after melt-solidification (glass batch) and then cooling to be solidified.

In the glass composition for glass fiber of the present embodiment, the 1000 poise temperature is in the range of 1350 to 1420° C., preferably in the range of 1360 to 1410° C., and more preferably in the range of 1370 to 1408° C. In the glass composition for glass fiber of the present invention, the liquid phase temperature (the temperature at which crystal precipitation occurs for the first time when the temperature of the molten glass is lowered) is in the range of 1000 to 1220° C., preferably in the range of 1020 to 1190° C., and more preferably in the range of 1030 to 1180° C. In the glass composition for glass fiber of the present invention, the temperature range (working temperature range) between 1000 poise temperature and the liquid phase temperature is 200° C. or more, preferably in the range of 200 to 400° C., and more preferably in the range of 210 to 360° C.

When the glass fiber of the present embodiment is formed from the glass composition for glass fiber of the present embodiment, at first, the glass raw material prepared as described above is supplied to a melting furnace, and is melted at a temperature range of 1000 poise temperature or more, specifically, a temperature range of 1450 to 1550° C. The molten glass melted at the above temperature is then discharged from 1 to 8000 nozzle tips or holes controlled at a predetermined temperature and cooled while stretched by winding at high speed to be solidified into glass fiber.

Glass single fiber (glass filament) discharged from one nozzle tip or hole, cooled and solidified typically has a perfect circle cross-sectional shape and has a diameter of 3.0 to 35.0 μm. On the other hand, when the above nozzle tip has a non-circular shape and has a protrusion or a notch for rapidly cooling the molten glass, controlling the temperature condition can provide a glass filament having a non-circular (for example, elliptical and oval) cross-sectional shape. When the glass filament has an elliptical or oval cross-sectional shape, the ratio of the major axis to the minor axis of the cross-sectional shape (major axis/minor axis) is, for example, in the range of 2.0 to 10.0 and the fiber diameter (converted fiber diameter) when the cross-sectional area is converted to a perfect circle is in the range of 3.0 to 35.0 μm.

The glass fiber of the present embodiment typically has a shape of a glass fiber bundle (glass strand) in which 10 to 8000 glass filaments above are bundled, and has a weight in the range of 1 to 10000 tex (g/km).

The glass fiber of the present embodiment can have various forms, which are obtained by further processing the above glass strands, such as yarns, woven fabrics, knitted fabrics, non-woven fabrics (including chopped strand mats and multiaxial non-woven fabrics), chopped strands, rovings, and powders.

The glass fiber of the present embodiment may be coated with an organic matter on the surface thereof for the purposes such as improvement of glass filament convergence, improvement of adhesiveness between glass fiber and a resin, and improvement of uniform dispersibility of glass fiber in a mixture of glass fiber and resin or inorganic material. Examples of such an organic matter can include starch, urethane resins, epoxy resins, vinyl acetate resins, acrylic resins, modified polypropylene (particularly carboxylic acid-modified polypropylene), and a copolymer of (poly)carboxylic acid (particularly maleic acid) and an unsaturated monomer. The glass fiber of the present embodiment may be coated with the resin composition including a silane coupling agent, a lubricant, surfactant, and the like in addition to these resins. The glass fiber of the present embodiment may be coated with the treating agent composition not including the above resins and including a silane coupling agent, surfactant, and the like. Such a resin composition or treating agent composition covers the glass fiber at a rate of 0.1 to 2.0% by mass based on the mass of the glass fiber of the present embodiment in a state where it is not coated with the resin composition or the treating agent composition. The glass fiber can be coated with an organic matter by applying a resin solution or a resin composition solution to the glass fiber using a known method such as a roller applicator, for example, in the manufacturing process of the glass fiber and then drying the glass fiber to which the resin solution or the resin composition solution is applied. The glass fiber can be coated with an organic matter by immersing the glass fiber of the present embodiment in the form of a woven fabric in the treating agent composition solution and then drying the glass fiber to which the treating agent composition is applied.

Examples of the silane coupling agent include aminosilanes (such as γ-aminopropyltriethoxysilane, N-β-(aminoethyl)-γ-aminopropyltrimethoxysilane, N-β-(aminoethyl)-N'-β-(aminoethyl)-γ-aminopropyltrimethoxysilane, and γ-anilinopropyltrimethoxysilane), chlorosilanes (such as γ-glycidoxypropyltrimethoxysilane), epoxysilanes (such as β-(3,4-epoxycyclohexyl)ethyltrimethoxysilane), mercaptosilanes (such as γ-mercaptotrimethoxysilane as γ-chloropropyltrimethoxysilane), vinylsilanes (such as vinyltrimethoxysilane and N-β-(N-vinylbenzylaminoethyl)-γ-aminopropyltrimethoxysilane), and acrylsilanes (such as γ-methacryloxypropyltrimethoxysilane). These can be used singly or in combinations of two or more.

Examples of the lubricant include modified silicone oil, animal oils (such as beef tallow) and hydrogenated product thereof, vegetable oils (such as soybean oil, coconut oil, rapeseed oil, palm oil, and castor oil) and hydrogenated products thereof, animal waxes (such as beeswax and lanolin), vegetable waxes (such as candelilla wax and carnauba wax), mineral waxes (such as paraffin wax and montan wax), condensates of a higher saturated fatty acid and a higher saturated alcohol (such as stearates such as lauryl stearate), polyethyleneimine, polyalkylpolyamine alkylamide derivatives, fatty acid amides (for example, dehydrated condensates of polyethylenepolyamines such as diethylenetriamine, triethylenetetramine, and tetraethylenepentamine and fatty acids such as lauric acid, myristic acid, palmitic acid, and stearic acid), and quaternary ammonium salts (such as alkyltrimethylammonium salts such as lauryltrimethylammonium chloride). These can be used singly or in combinations of two or more.

Examples of the surfactant include nonionic surfactants, cationic surfactants, anionic surfactants, and amphoteric surfactants. These can be used singly or in combinations of two or more.

Examples of the nonionic surfactant include ethylene oxide propylene oxide alkyl ether, polyoxyethylene alkyl ether, polyoxyethylene-polyoxypropylene-block copolymer, alkyl polyoxyethylene-polyoxypropylene block copolymer ether, polyoxyethylene fatty acid ester, polyoxyethylene fatty acid monoester, polyoxyethylene fatty acid diester, polyoxyethylene sorbitan fatty acid ester, glycerol fatty acid ester ethylene oxide adduct, polyoxyethylene caster oil ether, hydrogenated castor oil ethylene oxide adduct, alkylamine ethylene oxide adduct, fatty acid amide ethylene oxide adduct, glycerol fatty acid ester, polyglycerol fatty acid ester, pentaerythritol fatty acid ester, sorbitol fatty acid ester, sorbitan fatty acid ester, sucrose fatty acid ester, polyhydric alcohol alkyl ether, fatty acid alkanolamide, acetylene glycol, acetylene alcohol, ethylene oxide adduct of acetylene glycol, and ethylene oxide adduct of acetylene alcohol.

Examples of the cationic surfactant include alkyldimethylbenzylammonium chloride, alkyltrimethylammonium chloride, alkyl dimethyl ethyl ammonium ethyl sulfate, higher alkylamine salts (such as acetate and hydrochloride), adduct of ethylene oxide to a higher alkylamine, condensate of a higher fatty acid and polyalkylene polyamine, a salt of an ester of a higher fatty acid and alkanolamine, a salt of higher fatty acid amide, imidazoline cationic surfactant, and alkyl pyridinium salt.

Examples of the anionic surfactant include higher alcohol sulfate salts, higher alkyl ether sulfate salts, α-olefin sulfate salts, alkylbenzene sulfonate salts, α-olefin sulfonate salts, reaction products of fatty acid halide and N-methyl taurine, dialkyl sulfosuccinate salts, higher alcohol phosphate ester salts, and phosphate ester salts of higher alcohol ethylene oxide adduct.

Examples of the amphoteric surfactant include amino acid amphoteric surfactants such as alkali metal salts of alkylaminopropionic acid, betaine amphoteric surfactants such as alkyldimethylbetaine, and imidazoline amphoteric surfactants.

The glass fiber-reinforced resin composition of the present embodiment includes the above glass fiber of the present embodiment. Specifically, the glass fiber-reinforced resin composition of the present embodiment includes 10 to 90% by mass of glass fiber with respect to the total amount of the glass fiber-reinforced resin composition, as the glass fiber-reinforced resin composition including resin (thermoplastic resin or thermosetting resin), glass fiber, and other additives. The glass fiber-reinforced resin composition of the present embodiment includes 90 to 10% by mass of a resin and includes other additives in the range of 0 to 40% by mass with respect to the total amount of the glass fiber-reinforced resin composition.

Examples of the above thermoplastic resin can include polyethylene, polypropylene, polystyrene, styrene/maleic anhydride resins, styrene/maleimide resins, polyacrylonitrile, acrylonitrile/styrene (AS) resins, acrylonitrile/butadiene/styrene (ABS) resins, chlorinated polyethylene/acrylonitrile/styrene (ACS) resins, acrylonitrile/ethylene/styrene (AES) resins, acrylonitrile/styrene/methyl acrylate (ASA) resins, styrene/acrylonitrile (SAN) resins, methacrylic resins, polyvinyl chloride (PVC), polyvinylidene chloride (PVDC), polyamide, polyacetal, polyethylene terephthalate (PET), polybutylene terephthalate (PBT), polytrimethylene terephthalate (PTT), polycarbonate, polyarylene sulfide, polyethersulfone (PES), polyphenylsulfone (PPSU), polyphenylene ether (PPE), modified polyphenylene ether (m-PPE), polyaryl ketone, liquid crystal polymer (LCP), fluororesins, polyetherimide (PEI), polyarylate (PAR), polysulfone (PSF), polyamideimide (PAI), polyaminobismaleimide (PABM), thermoplastic polyimide (TPI), polyethylene naphthalene (PEN), ethylene/vinyl acetate (EVA) resins, ionomer (TO) resins, polybutadiene, styrene/butadiene resins, polybutylene, polymethylpentene, olefin/vinyl alcohol resins, cyclic olefin resins, cellulose resins, and polylactic acid. The glass fiber-reinforced resin molded product obtained from the glass fiber-reinforced resin composition of the present embodiment has many applications that require a high tensile strength, a high bending strength, a high bending elastic modulus, and a high impact strength, and hence among these, as the above thermoplastic resin, polyamide, polybutylene terephthalate, or polycarbonate is preferable, and polyamide is more preferable.

Specific examples of the polyethylene include high density polyethylene (HDPE), medium density polyethylene, low density polyethylene (LDPE), linear low density polyethylene (LLDPE), and ultra high molecular weight polyethylene.

Examples of the polypropylene include isotactic polypropylene, atactic polypropylene, syndiotactic polypropylene, and mixtures thereof.

Examples of the polystyrene include general-purpose polystyrene (GPPS), which is an atactic polystyrene having an atactic structure, high impact polystyrene (HIPS) with a rubber component added to GPPS, and syndiotactic polystyrene with syndiotactic structure.

Examples of the methacrylic resin include homopolymers of one of acrylic acid, methacrylic acid, styrene, methyl acrylate, ethyl acrylate, ethyl methacrylate, butyl acrylate, butyl methacrylate, and fatty acid vinyl ester (except for styrene and fatty acid vinyl ester) or copolymers obtained by copolymerizing two or more of these (except for a binary copolymer of styrene and fatty acid vinyl ester).

Examples of the polyvinyl chloride include a vinyl chloride homopolymer, a copolymer of a vinyl chloride monomer and a copolymerizable monomer, or a graft copolymer obtained by graft polymerization of a vinyl chloride monomer to polymer polymerized by a conventionally known method such as emulsion polymerization method, suspension polymerization method, micro suspension polymerization method, or bulk polymerization method.

Examples of the polyamide can include one of a plurality of components such as polycaproamide (nylon 6), polyhexamethylene adipamide (nylon 66), polytetramethylene adipamide (nylon 46), polytetramethylene sebacamide (nylon 410), polypentamethylene adipamide (nylon 56), polypentamethylene sebacamide (nylon 510), polyhexamethylene sebacamide (nylon 610), polyhexamethylene dodecamide (nylon 612), polydecamethylene adipamide (nylon 106), polydecamethylene sebacamide (nylon 1010), polydecamethylene dodecamide (Nylon 1012), polyundecanamide (Nylon 11), polyundecamethylene adipamide (Nylon 116), polydodecanamide (nylon 12), polyxylene adipamide (nylon XD6), polyxylene sebacamide (nylon XD10), polymetaxylylene adipamide (nylon MXD6), polyparaxylylene adipamide (nylon PXD6), polytetramethylene terephthalamide (nylon 4T), polypentamethylene terephthalamide (nylon 5T), polyhexamethylene terephthalamide (nylon 6T), polyhexamethylene isophthalamide (nylon 61), polynonamethylene terephthalamide (nylon 9T), polydecamethylene terephthalamide (nylon 10T), polyundecamethylene terephthalamide (nylon 11T), polydodecamethylene terephthalamide (nylon 12T), polytetramethylene isophthalamide (nylon 41), polybis(3-methyl-4-aminohexyl) methane terephthalamide (nylon PACMT), polybis(3-methyl-4-aminohexyl) methane isophthalamide (nylon PACMI), polybis(3-methyl-4-aminohexyl) methane dodecamide (nylon PACM12), and polybis(3-methyl-4-aminohexyl) methane tetradecamide (nylon PACM14) or copolymers or mixtures of two or more of the plurality of components.

Examples of the polyacetal include a homopolymer with oxymethylene units as the main repeating unit, and a copolymer mainly consisting of oxymethylene units and containing oxyalkylene units having 2 to 8 adjacent carbon atoms in the main chain.

Examples of the polyethylene terephthalate include a polymer obtained by polycondensation of terephthalic acid or a derivative thereof with ethylene glycol.

Examples of the polybutylene terephthalate include a polymer obtained by polycondensation of terephthalic acid or a derivative thereof with 1,4-butanediol.

Examples of the polytrimethylene terephthalate include polymers obtained by polycondensation of terephthalic acid or a derivative thereof with 1,3-propanediol.

Examples of the polycarbonate include polymers obtained by a transesterification method in which a dihydroxydiaryl compound is reacted with a carbonate such as diphenyl carbonate in a molten state; or polymers obtained by phosgene method in which a dihydroxyaryl compound is reacted with phosgene.

Examples of the polyarylene sulfide include linear polyphenylene sulfide, cross linked polyphenylene sulfide having a high molecular weight obtained by performing a curing reaction after polymerization, polyphenylene sulfide sulfone, polyphenylene sulfide ether, and polyphenylene sulfide ketone.

Examples of the modified polyphenylene ether include: a polymer alloy of poly(2,6-dimethyl-1,4-phenylene)ether and polystyrene; a polymer alloy of poly(2,6-dimethyl-1,4-phenylene)ether and a styrene/butadiene copolymer; a polymer alloy of poly(2,6-dimethyl-1,4-phenylene)ether and a styrene/maleic anhydride copolymer; a polymer alloy of poly(2,6-dimethyl-1,4-phenylene)ether and polyamide; and a polymer alloy of poly(2,6-dimethyl-1,4-phenylene)ether and styrene/butadiene/acrylonitrile copolymer.

Examples of the polyaryl ketone include polyetherketone (PEK), polyetheretherketone (PEEK), polyetherketoneketone (PEKK), and polyetheretherketoneketone (PEEKK).

Examples of the liquid crystal polymer (LCP) include a polymer (copolymer) consisting of one or more structural units selected from aromatic hydroxycarbonyl units which are thermotropic liquid crystal polyesters, aromatic dihydroxy units, aromatic dicarbonyl units, aliphatic dihydroxy units, aliphatic dicarbonyl units, and the like.

Examples of the fluororesin include polytetrafluoroethylene (PTFE), perfluoroalkoxy resins (PFA), fluorinated ethylene propylene resins (FEP), fluorinated ethylene tetrafluoroethylene resins (ETFE), polyvinyl fluoride (PVF), polyvinylidene fluoride (PVDF), polychlorotrifluoroethylene (PCTFE), and ethylene/chlorotrifluoroethylene resin (ECTFE).

Examples of the ionomer (TO) resin include copolymers of an olefin or a styrene and an unsaturated carboxylic acid, wherein a part of carboxyl groups is neutralized with a metal ion.

Examples of the olefin/vinyl alcohol resin include ethylene/vinyl alcohol copolymers, propylene/vinyl alcohol copolymers, saponified products of ethylene/vinyl acetate copolymers, and saponified products of propylene/vinyl acetate copolymers.

Examples of the cyclic olefin resin include monocyclic compounds such as cyclohexene, polycyclic compounds such as tetracyclopentadiene, and polymers of cyclic olefin monomers.

Examples of the polylactic acid include poly-L-lactic acid which is a homopolymer of L-form, poly-D-lactic acid which is a homopolymer of D-form, or a stereocomplex polylactic acid which is a mixture thereof.

Examples of the cellulose resin can include methylcellulose, ethyl cellulose, hydroxycellulose, hydroxymethylcellulose, hydroxyethyl cellulose, hydroxyethyl methylcellulose, hydroxypropylmethylcellulose, cellulose acetate, cellulose propionate, and cellulose butyrate.

Examples of the above thermosetting resin can include unsaturated polyester resins, vinyl ester resins, epoxy (EP) resins, melamine (MF) resins, phenol resins (PF), urethane resins (PU), polyisocyanate, polyisocyanurate, polyimide (PI), urea (UF) resins, silicone (SI) resins, furan (FR) resins, benzoguanamine (BR) resins, alkyd resins, xylene resins, bismaleimide triazine (BT) resins, and diallyl phthalate resin (PDAP).

Specific examples of the unsaturated polyester resin include sresin obtained by esterification reaction of aliphatic unsaturated dicarboxylic acid and aliphatic diol.

Examples of the vinyl ester resin include bis vinyl ester resins and novolac vinyl ester resins.

Examples of the epoxy resin include bisphenol A epoxy resins, bisphenol F epoxy resins, bisphenol E epoxy resins, bisphenol S epoxy resins, bisphenol M epoxy resins (4,4'-(1,3-phenylenediisopropylidene)bisphenol epoxy resins), bisphenol P epoxy resins (4,4'-(1,4-phenylenediisopropylidene)bisphenol epoxy resins), bisphenol Z epoxy resins (4,4'-cyclohexylidne bisphenol epoxy resins), phenol novolac epoxy resins, cresol novolac epoxy resins, tetraphenol group ethane novolac type epoxy resins, novolac epoxy resins having a condensed ring aromatic hydrocarbon structure, biphenyl epoxy resins, aralkyl epoxy resins such as xylylene epoxy resins and phenyl aralkyl epoxy resins, naphthylene ether epoxy resins, naphthol epoxy resins, naphthalene diol epoxy resins, bifunctional or tetrafunctional epoxy naphthalene resins, binaphthyl epoxy resins, naphthalene aralkyl epoxy resins, anthracene epoxy resins, phenoxy epoxy resins, dicyclopentadiene epoxy resins, norbornene epoxy resins, adamantane epoxy resins, and fluorene epoxy resins.

Examples of the melamine resin include a polymer formed by polycondensation of melamine (2,4,6-triamino-1,3,5-triazine) and formaldehyde.

Examples of the phenolic resin include novolac phenolic resins such as phenol novolac resins, cresol novolac resins, and bisphenol A novolac resins, resol phenol resins such as methylol resole resins and dimethylene ether resole resins, or aryl alkylene phenol resins, and include one of these or combinations of two or more.

Examples of the urea resin include a resin obtained by condensation of urea and formaldehyde.

The above thermoplastic resin or the above thermosetting resin may be used singly or in combinations of two or more.

Examples of the above other additives can include reinforcing fiber other than glass fiber (for example, carbon fiber and metal fiber), a filler other than glass fiber (for example, glass powder, talc, and mica), a flame retardant, an UV absorber, a heat stabilizer, an antioxidant, an antistatic agent, a fluidity improver, an anti-blocking agent, a lubricant, a nucleating agent, an antibacterial agent, and pigment.

The glass fiber-reinforced resin composition of the present invention can be molded by known molding methods such as injection molding method, injection compression molding method, two-color molding method, hollow molding method, foam molding method (including supercritical fluid), insert molding method, in-mold coating molding method, extrusion molding method, sheet molding method, thermoforming method, rotational molding method, laminate molding method, press molding method, blow molding method, stamping molding method, infusion method, hand lay-up method, spray-up method, resin transfer molding method, sheet molding compound method, bulk molding compound method, pultrusion method, and filament winding method to obtain various glass fiber-reinforced resin molded products.

Examples of applications of such molded products can include electronic device housing, electronic components (printed wiring board), vehicle exterior members (such as bumper, fender, bonnet, air dam, and wheel cover), vehicle interior members (such as door trim and ceiling materials), vehicle engine members (such as oil pan, engine cover, intake manifold, and exhaust manifold), muffler members (such as silencers), and high pressure tank.

The glass fiber of the present embodiment can be suitably used as a reinforcing material for inorganic materials such as gypsum and cement, in addition to the glass fiber-reinforced resin composition of the present embodiment. For example, when used as a reinforcing material for gypsum (especially, gypsum board having a thickness of 4 to 60 mm), the glass fiber comprising the above range can be included in a range of 0.1 to 4.0% by mass with respect to the total mass of gypsum.

Examples and Comparative Examples of the present invention will be shown.

EXAMPLES

At first, glass raw material was mixed to obtain a glass batch so that the glass composition after melt-solidification is the composition of Examples 1 to 10 or Comparative Examples 1 to 9 shown in Table 1 or Table 2.

Next, the glass batch corresponding to the glass composition for glass fiber of Examples 1 to 10 or Comparative Examples 1 to 9 was melted at 1550° C. for 6 hours to obtain homogeneous glass cullet. This was then placed in an 80 mm diameter platinum crucible, melted at 1500° C. for 4 hours, and taken out from the crucible to obtain a glass bulk. The obtained glass bulk was then annealed at 580° C. for 8 hours to obtain a test piece.

For the obtained test piece, the dielectric properties (dielectric constant and dielectric loss tangent) and the phase separation properties were measured or evaluated by the following methods. Melting properties (1000 poise temperature, liquid phase temperature, and working temperature range) were measured or calculated using glass cullet obtained in the test piece preparation process. The evaluation results are shown in Table 1 or Table 2.

[Measurement Method of Dielectric Properties]

The test piece was polished to prepare an 80 mm×3 mm (1 mm thickness) polished test piece. The obtained polished test piece was completely dried and then stored in a room at 23° C. and a humidity of 60% for 24 hours. For each of the obtained polished test pieces, according to JIS C 2565: 1992, the dielectric constant (dielectric constant Dk) and dielectric loss tangent (dissipation factor Df) at 10 GHz were measured using a cavity resonator method dielectric constant measuring apparatus ADMS01Oc1, manufactured by AET, Inc.

[Evaluation Method of Phase Separation Properties]

The disc-shaped test piece was stood on the boundary between a black plate and a white plate, and the boundary surface between the black plate and the white plate was observed from the upper surface of the test piece through the test piece. When no white turbidity (phase separation) was observed in the test piece and the boundary surface was able to be clearly observed, it was evaluated as "Very good"; when slight turbidity was seen in the test piece but the boundary surface was able to be clearly observed, it was evaluated as "Good", and when the boundary surface was not able to be clearly observed due to white turbidity in the test piece, it was evaluated as "Bad".

[Measurement Method of 1000 Poise Temperature]

The 1000 poise temperature was determined by melting glass cullet in a platinum crucible using a high-temperature electric furnace with a rotational viscometer (manufactured by Shibaura System Co., Ltd.), measuring the viscosity of the molten glass continuously with changing the melting temperature by using a rotating Brookfield viscometer, and measuring the corresponding temperature when the rotational viscosity was 1000 poise.

[Measurement Method of Liquid Phase Temperature]

The glass cullet was pulverized, and 40 g of glass particles having a particle size of 0.5 to 1.5 mm was placed in a 180×20×15 mm platinum boat, heated in a tubular electric furnace with a temperature gradient of 1000 to 1400° C. for 8 hours or more, then taken out from the tubular electric furnace, and observed with a polarizing microscope, and the position where the glass-derived crystal (devitrification) started to precipitate was specified. The temperature in the tubular electric furnace was measured by using a B thermocouple, and the temperature at the position where the crystal started to precipitate was determined to obtain the liquid phase temperature.

[Calculation Method of Working Temperature Range]

The working temperature range was calculated from the difference between the 1000 poise temperature and the liquid phase temperature.

TABLE 1

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| SiO2 (% by mass) | 56.6 | 56.6 | 57.6 | 58.8 | 57.6 | 56.6 | 56.7 | 57.6 | 57.6 | 53.6 |
| B2O3 (% by mass) | 22.0 | 22.0 | 20.0 | 18.3 | 18.9 | 21.9 | 18.0 | 17.9 | 18.3 | 22.7 |
| Al2O3 (% by mass) | 12.3 | 11.3 | 11.3 | 11.0 | 11.3 | 10.3 | 11.3 | 11.2 | 11.3 | 12.4 |
| SrO (% by mass) | 4.1 | 4.1 | 2.1 | 1.0 | 2.1 | 4.1 | 2.1 | 2.1 | 2.7 | 4.1 |
| MgO (% by mass) | 2.1 | 2.1 | 2.1 | 2.1 | 3.1 | 2.1 | 2.1 | 2.1 | 3.1 | 1.0 |
| CaO (% by mass) | 2.1 | 2.1 | 2.1 | 4.1 | 2.1 | 2.1 | 4.1 | 2.1 | 2.1 | 3.1 |
| F2 (% by mass) | 0.8 | 0.8 | 0.8 | 1.6 | 0.8 | 0.8 | 1.6 | 0.8 | 0.8 | 1.0 |
| Cl2 (% by mass) | 0.0 | 0.0 | 0.0 | 0.0 | 0.0 | 0.0 | 0.0 | 0.0 | 0.0 | 0.0 |
| TiO2 (% by mass) | 0.0 | 1.0 | 4.0 | 3.1 | 4.1 | 2.1 | 4.1 | 4.1 | 4.1 | 2.1 |
| ZnO (% by mass) | 0.0 | 0.0 | 0.0 | 0.0 | 0.0 | 0.0 | 0.0 | 2.1 | 0.0 | 0.0 |
| Li2O (% by mass) | 0.0 | 0.0 | 0.0 | 0.0 | 0.0 | 0.0 | 0.0 | 0.0 | 0.0 | 0.0 |
| Na2O (% by mass) | 0.0 | 0.0 | 0.0 | 0.0 | 0.0 | 0.0 | 0.0 | 0.0 | 0.0 | 0.0 |
| K2O (% by mass) | 0.0 | 0.0 | 0.0 | 0.0 | 0.0 | 0.0 | 0.0 | 0.0 | 0.0 | 0.0 |
| ZrO2 (% by mass) | 0.0 | 0.0 | 0.0 | 0.0 | 0.0 | 0.0 | 0.0 | 0.0 | 0.0 | 0.0 |
| Cr2O3 (% by mass) | 0.0 | 0.0 | 0.0 | 0.0 | 0.0 | 0.0 | 0.0 | 0.0 | 0.0 | 0.0 |
| $(B_2O_3{}^3 \times Al_2O_3)/(SrO^{(1/2)} \times 1000)$ | 64.7 | 59.4 | 62.4 | 67.4 | 52.6 | 53.4 | 45.5 | 44.3 | 42.1 | 71.6 |
| $((F_2 + Cl_2)^{(1/8)} \times B_2O_3{}^3 \times Al_2O_3)/(SrO^{(1/2)} \times 1000)$ | 62.9 | 57.8 | 60.7 | 71.5 | 51.2 | 52.0 | 48.2 | 43.1 | 41.0 | 71.6 |

TABLE 1-continued

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| $(F_2^{(1/8)} \times B_2O_3^{3} \times Al_2O_3)/(SrO^{(1/2)} \times 1000)$ | 62.9 | 57.8 | 60.7 | 71.5 | 51.2 | 52.0 | 48.2 | 43.1 | 41.0 | 71.6 |
| 1000 poise temperature (° C.) | 1403 | 1383 | 1395 | 1385 | 1382 | 1367 | 1372 | 1378 | 1390 | 1351 |
| Liquid phase temperature (° C.) | 1050 | 1085 | 1176 | 1141 | 1141 | 1003 | 1172 | 1152 | 1153 | — |
| Working temperature range (° C.) | 353 | 298 | 219 | 244 | 241 | 364 | 200 | 226 | 237 | — |
| Dielectric constant | 4.3 | 4.3 | 4.2 | 4.3 | 4.5 | 4.2 | 4.6 | 4.4 | 4.6 | 4.4 |
| Dielectric loss tangent | 0.0018 | 0.0019 | 0.0017 | 0.0017 | 0.0019 | 0.0017 | 0.0020 | 0.0022 | 0.0023 | 0.0017 |
| Phase separation | Very good | Very good | Very good | Good | Good | Good | Good | Good | Good | Very good |

TABLE 2

|  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|
| $SiO_2$ (% by mass) | 58.0 | 55.0 | 59.0 | 54.6 | 59.0 | 56.3 | 58.5 | 55.0 | 60.5 |
| $B_2O_3$ (% by mass) | 17.0 | 26.0 | 18.0 | 19.6 | 20.0 | 19.5 | 20.0 | 20.0 | 18.5 |
| $Al_2O_3$ (% by mass) | 12.0 | 10.5 | 8.5 | 14.8 | 10.8 | 10.0 | 10.0 | 10.5 | 10.3 |
| SrO (% by mass) | 2.0 | 3.5 | 1.5 | 1.0 | 0.0 | 6.5 | 4.0 | 1.0 | 2.1 |
| MgO (% by mass) | 4.0 | 2.0 | 3.5 | 3.8 | 4.0 | 2.3 | 4.0 | 2.0 | 4.0 |
| CaO (% by mass) | 4.7 | 2.0 | 5.0 | 3.8 | 4.0 | 3.1 | 1.5 | 4.5 | 2.0 |
| $F_2$ (% by mass) | 0.3 | 1.0 | 0.5 | 0.5 | 0.2 | 0.3 | 0.0 | 3.0 | 0.5 |
| $Cl_2$ (% by mass) | 0.0 | 0.0 | 0.0 | 0.0 | 0.0 | 0.0 | 0.0 | 0.0 | 0.0 |
| $TiO_2$ (% by mass) | 2.0 | 0.0 | 3.0 | 1.9 | 2.0 | 2.0 | 2.0 | 4.0 | 2.1 |
| ZnO (% by mass) | 0.0 | 0.0 | 1.0 | 0.0 | 0.0 | 0.0 | 0.0 | 0.0 | 0.0 |
| $Li_2O$ (% by mass) | 0.0 | 0.0 | 0.0 | 0.0 | 0.0 | 0.0 | 0.0 | 0.0 | 0.0 |
| $Na_2O$ (% by mass) | 0.0 | 0.0 | 0.0 | 0.0 | 0.0 | 0.0 | 0.0 | 0.0 | 0.0 |
| $K_2O$ (% by mass) | 0.0 | 0.0 | 0.0 | 0.0 | 0.0 | 0.0 | 0.0 | 0.0 | 0.0 |
| $ZrO_2$ (% by mass) | 0.0 | 0.0 | 0.0 | 0.0 | 0.0 | 0.0 | 0.0 | 0.0 | 0.0 |
| $Cr_2O_3$ (% by mass) | 0.0 | 0.0 | 0.0 | 0.0 | 0.0 | 0.0 | 0.0 | 0.0 | 0.0 |
| $(B_2O_3^{3} * Al_2O_3)/(SrO^{(1/2)} * 1000)$ | 41.7 | 98.6 | 40.5 | 111.4 | — | 29.1 | 40.0 | 84.0 | 45.0 |
| $((F_2 + Cl_2)^{(1/8)}*B_2O_3^{3} * Al_2O_3)/(SrO^{(1/2)} * 1000)$ | 35.9 | 98.6 | 37.1 | 102.2 | — | 25.0 | 0 | 96.4 | 41.3 |
| $(F_2^{(1/8)}*B_2O_3^{3} * Al_2O_3)/(SrO^{(1/2)} * 1000)$ | 35.9 | 98.6 | 37.1 | 102.2 | — | 25.0 | 0 | 96.4 | 41.3 |
| 1000 poise temperature (° C.) | 1379 | 1383 | 1369 | 1362 | 1409 | 1361 | 1425 | 1340 | 1414 |
| Liquid phase temperature (° C.) | — | — | — | — | — | — | — | — | — |
| Working temperature range (° C.) | — | — | — | — | — | — | — | — | — |
| Dielectric constant | 4.8 | 4.3 | 4.6 | 4.8 | 4.6 | 4.8 | 4.6 | 4.3 | 4.4 |
| Dielectric loss tangent | 0.0031 | 0.0018 | 0.0020 | 0.0034 | 0.0025 | 0.0025 | 0.0022 | 0.0017 | 0.0019 |
| Phase separation | Very good | Bad | Bad | Very good | Very good | Good | Good | Bad | Bad |

As shown in Table 1, the glass composition for glass fiber of the present invention including $SiO_2$ in the range of 52.0 to 59.5% by mass, $B_2O_3$ in the range of 17.5 to 25.5% by mass, $Al_2O_3$ in the range of 9.0 to 14.0% by mass, SrO in the range of 0.5 to 6.0% by mass, MgO in the range of 1.0 to 5.0% by mass, and CaO in the range of 1.0 to 5.0% by mass and including $F_2$ and $Cl_2$ in the range of 0.1 to 2.5% by mass in total, which are described in Examples 1 to 10, with respect to the total amount of the glass composition for glass fiber, had a low dielectric constant (4.6 or less) and a low dielectric loss tangent (0.0024 or less), reduced the viscosity at high temperatures (the 1000 poise temperature was 1420° C. or less), and suppressed the occurrence of phase separation.

On the other hand, as shown in Table 2, the glass composition for glass fiber in Comparative Example 1 had a content of $B_2O_3$ of less than 17.5% by mass, and the dielectric constant and the dielectric loss tangent of the glass composition for glass fiber were insufficiently reduced.

The glass composition for glass fiber in Comparative Example 2 had a content of $B_2O_3$ of more than 25.5%, and the occurrence of phase separation in the glass composition for glass fiber was insufficiently suppressed.

The glass composition for glass fiber in Comparative Example 3 had a content of $Al_2O_3$ of less than 9.0% by mass, and the occurrence of phase separation in the glass composition for glass fiber was insufficiently suppressed.

The glass composition for glass fiber in Comparative Example 4 had a content of $Al_2O_3$ of more than 14.0% by mass, and the dielectric constant and the dielectric loss tangent of the glass composition for glass fiber were insufficiently reduced.

The glass composition for glass fiber of Comparative Example 5 had a content of SrO of less than 0.5% by mass, and the dielectric loss tangent of the glass composition for glass fiber was insufficiently reduced.

The glass composition for glass fiber of Comparative Example 6 had a content of SrO of more than 6.0% by mass, and the dielectric constant and the dielectric loss tangent of the glass composition for glass fiber were insufficiently reduced.

The glass composition for glass fiber of Comparative Example 7 has a total content of $F_2$ and $Cl_2$ (substantially content of $F_2$) of less than 0.1% by mass, and the viscosity at high temperatures of the glass composition for glass fiber was insufficiently reduced (the 1000 poise temperature was more than 1420° C.).

The glass composition for glass fiber in Comparative Example 8 had a total content of $F_2$ and $Cl_2$ (substantially content of $F_2$) of more than 2.5% by mass, and the occurrence of phase separation in the glass composition for glass fiber was insufficiently suppressed.

The glass composition for glass fiber in Comparative Example 9 had a content of $SiO_2$ of more than 59.5%, and the occurrence of phase separation in the glass composition for glass fiber was insufficiently suppressed.

Example 11

Glass raw materials were mixed so that the glass composition after melt-solidification had the same composition as in Example 1, and a glass batch was obtained. The glass batch was placed in a platinum crucible and melted with stirring while being held at a temperature of 1550° C. for 6 hours in an electric furnace to obtain a homogeneous molten glass. The obtained molten glass was then poured onto a carbon plate to produce a glass cullet.

The obtained glass cullet was then placed in a small cylindrical platinum bushing with one circular nozzle tip at the bottom of the container, melted by heating to a predetermined temperature, and cooled and solidified while being stretched by winding the molten glass discharged from the nozzle tip at a predetermined speed, providing the glass fiber (glass filament) comprising a perfect circular section and a fiber diameter of 13 μm.

From Example 11, it is clear that glass fiber can be formed from the glass composition for glass fiber of the present invention.

The invention claimed is:

1. A glass composition for glass fiber comprising:
   $SiO_2$ in a range of 52.0 to 56.6% by mass;
   $B_2O_3$ in a range of 20.8 to 25.5% by mass;
   $Al_2O_3$ in a range of 10.8 to 14.0% by mass;
   SrO in a range of 2.8 to 4.1% by mass;
   MgO in a range of 1.0 to 5.0% by mass;
   CaO in a range of 1.0 to 3.6% by mass,
   $ZrO_2$ less than 0.4% by mass;
   less than 1.0% by mass of oxides of P, Mn, Co, Ni, Cu, Mo, W, Ce, Y, and La in total, and free of oxides of Ba; and
   the total content of $Na_2O$, $K_2O$, and $Li_2O$ is less than 1.0% by mass;
   and comprising
   $F_2$ and $Cl_2$ in a range of 0.3 to 2.5% by mass in total, with respect to total amount;
   having a dielectric constant of 4.5 or less at a frequency of 10 GHz.

2. The glass composition for glass fiber according to claim 1, wherein a content X (% by mass) of $B_2O_3$, a content Y (% by mass) of $Al_2O_3$, and a content Z (% by mass) of SrO satisfy following formula (1):

$$50.0 \leq (X^3 \times Y)/(1000 \times Z^{1/2}) \leq 80.0 \tag{1}$$

3. The glass composition for glass fiber according to claim 2, wherein the X, Y, and Z satisfy following formula (2):

$$56.5 \leq (X^3 \times Y)/(1000 \times Z^{1/2}) \leq 66.0 \tag{2}$$

4. The glass composition for glass fiber according to claim 1, wherein a content X (% by mass) of $B_2O_3$, a content Y (% by mass) of $Al_2O_3$, a content Z (% by mass) of SrO, and a total content W (% by mass) of $F_2$ and $Cl_2$ satisfy following formula (3):

$$50.0 \leq (W^{1/8} \times X^3 \times Y)/(1000 \times Z^{1/2}) \leq 85.0 \tag{3}$$

5. The glass composition for glass fiber according to claim 4, wherein the W, X, Y, and Z satisfy following formula (4):

$$55.0 \leq (W^{1/8} \times X^3 \times Y)/(1000 \times Z^{1/2}) \leq 66.0 \tag{4}$$

6. Glass fiber formed from the glass composition for glass fiber according to claim 1.

7. A glass fiber-reinforced resin composition comprising the glass fiber according to claim 6.

* * * * *